United States Patent
Hirayu

(10) Patent No.: US 7,331,559 B2
(45) Date of Patent: Feb. 19, 2008

(54) SUPPORT STRUCTURE OF PARTS FOR VEHICLE

(75) Inventor: Toru Hirayu, Atsugi (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 104 days.

(21) Appl. No.: 11/100,431

(22) Filed: Apr. 7, 2005

(65) Prior Publication Data

US 2005/0224683 A1 Oct. 13, 2005

(30) Foreign Application Priority Data

Apr. 12, 2004 (JP) .......................... P 2004-116638

(51) Int. Cl.
*F16M 13/00* (2006.01)
*B60R 16/04* (2006.01)

(52) U.S. Cl. .................. 248/503; 180/68.5; 429/99

(58) Field of Classification Search ................ 246/503, 246/500, 505, 680, 346.03; 180/68.5; 429/99
See application file for complete search history.

(56) References Cited

U.S. PATENT DOCUMENTS

| | | | | |
|---|---|---|---|---|
| 1,607,908 A | * | 11/1926 | Nelson ........................ | 429/99 |
| 2,551,990 A | * | 5/1951 | Wills ............................ | 429/96 |
| 2,849,074 A | * | 8/1958 | Key et al. .................. | 180/68.5 |
| 3,866,704 A | * | 2/1975 | Bowers et al. ............. | 180/68.5 |
| 4,520,887 A | * | 6/1985 | DiFazio ...................... | 180/68.5 |
| 4,754,827 A | * | 7/1988 | Hirabayashi ............... | 180/68.5 |
| 5,085,395 A | * | 2/1992 | Frater et al. ................. | 248/552 |
| 5,086,860 A | * | 2/1992 | Francis et al. ............. | 180/68.5 |
| 5,222,711 A | * | 6/1993 | Bell ........................... | 248/503 |
| 6,102,356 A | * | 8/2000 | Huntley et al. ............. | 248/500 |
| 6,648,090 B2 | * | 11/2003 | Iwase ......................... | 180/68.5 |
| 7,014,002 B2 | * | 3/2006 | Mizuta ....................... | 180/68.5 |

FOREIGN PATENT DOCUMENTS

| | | | |
|---|---|---|---|
| JP | 53-99748 | | 8/1978 |
| JP | 62-135354 | | 8/1987 |
| JP | 08048196 A | * | 2/1996 |
| JP | 08329917 A | * | 12/1996 |
| JP | 2002-029336 | | 1/2002 |

OTHER PUBLICATIONS

Japanese Office Action (with English Translation) Issued in Japanese Patent Application No. JP 2004-116638, dated Sep. 11, 2007.

* cited by examiner

*Primary Examiner*—Anita M. King
(74) *Attorney, Agent, or Firm*—McDermott Will & Emery LLP

(57) ABSTRACT

A support structure of parts for a vehicle including: a tray fixed to a structural member of a vehicle body for mounting a first part thereto; a retainer member for retaining the first part on the tray; and a vertically extending support member for supporting a second part on the side of the first part. The support member is connected to the tray at a lower end thereof and to the retainer member at an upper end thereof.

6 Claims, 3 Drawing Sheets

SUPPORT STRUCTURE OF PARTS FOR VEHICLE

BACKGROUND OF THE INVENTION

1. Field of the Invention

The present invention relates to a support structure of parts for a vehicle, and particularly to a support structure of a battery and a fuse box mounted in an engine compartment of a vehicle.

2. Description of Related Art

A variety of parts for a vehicle including a battery, a fuse box, ABS actuator, electronic control unit, etc. are mounted in an engine compartment of the vehicle, in which the battery and the fuse box are mounted on the upper face of a front side member.

The Japanese Patent Application Laid-open Publication No. 2002-29336 discloses a support structure in which a battery is mounted on a tray provided on a front side member, and a bracket is provided on the side of the battery and a fuse box is mounted on the bracket.

SUMMARY OF THE INVENTION

However, since the above support structure has a cantilever structure in which only the lower part of the bracket is connected to the tray, the strength of the bracket is lowered and the supporting rigidity of the fuse box is degraded. It is necessary to increase the board thickness in order to improve the rigidity of the bracket, but it causes weight increase.

Also, since a vertical rod for tying the battery to the tray is arranged in a gap between the bracket and the battery, the space efficiency of the engine compartment might be deteriorated.

The present invention was made in the light of the problem. An object of the present invention is to provide a support structure of parts for a vehicle, which enhances the mounting strength of parts such as a fuse box.

An aspect of the present invention is a support structure of parts for a vehicle comprising: a tray fixed to a structural member of a vehicle body for mounting a first part thereto; a retainer member for retaining the first part on the tray; and a vertically extending support member for supporting a second part on the side of the first part, which is connected to the tray at a lower end thereof and to the retainer member at an upper end thereof.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
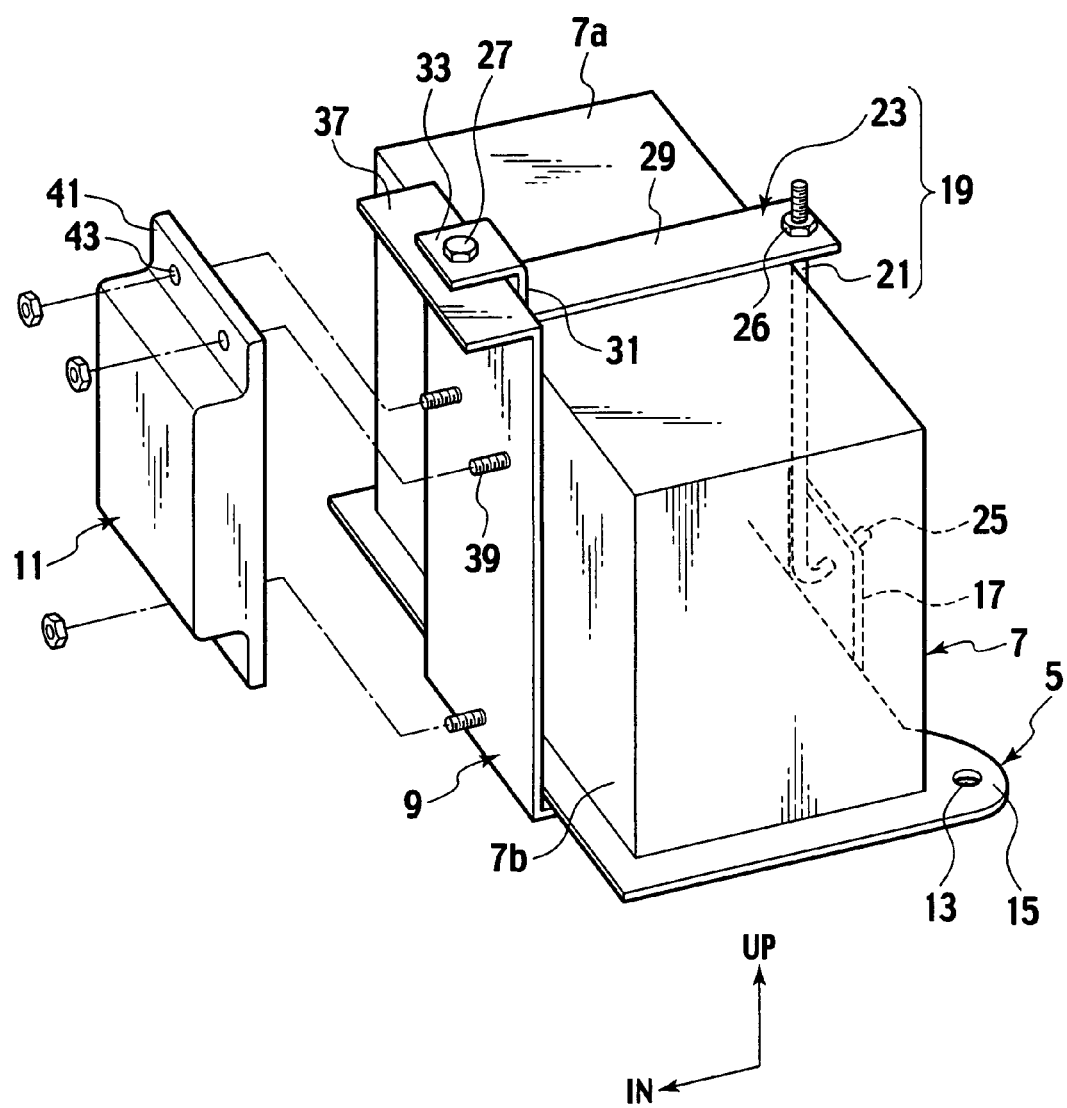
FIG. 1 is a perspective view showing a battery and a fuse box employing a support structure according to an embodiment of the present invention.

An embodiment of the present invention will be explained below with reference to the drawings, wherein like members are designated by like reference characters.

Figure 2:
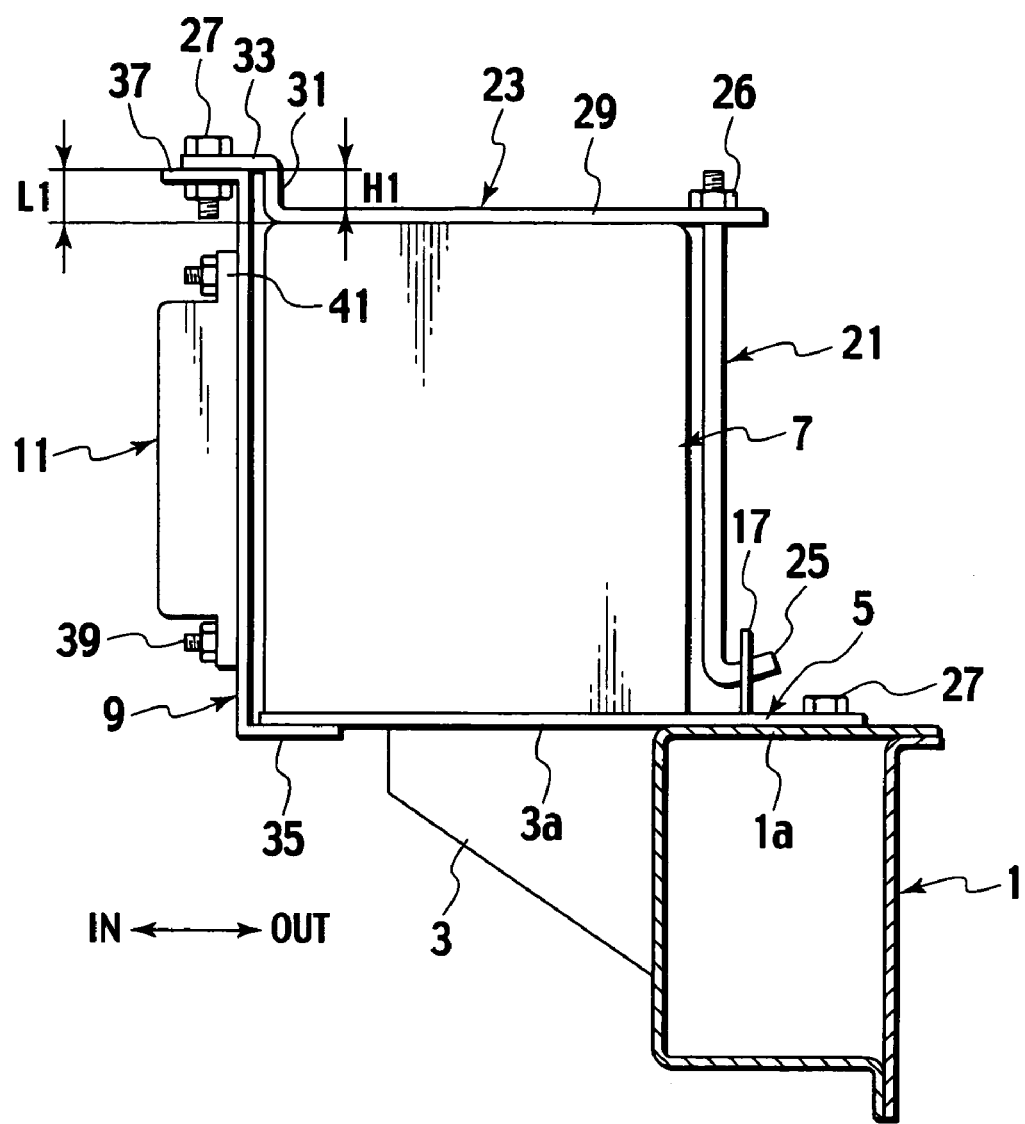
FIG. 2 is a partially sectional front view showing a vehicle front body which the battery and the fuse box in FIG. 1 are mounted to, seen from the front of the vehicle.

In an engine compartment of a vehicle, side members 1 are extended in the longitudinal direction of the vehicle on both right and left sides thereof. Each of the side members 1 is formed in the closed sectional structure having a rectangular shape in section, as shown in FIG. 2, and a support bracket 3 is provided on an inner side in the vehicle transverse direction of the side member 1. A top face 3a of this support bracket 3 is set at the same height as that of a top face 1a of the side member 1. And on these top faces 1a and 3a of the side member 1 and the support bracket 3, a tray 5 is provided to support a square-shaped heavy battery 7 (first part) using a retainer member 19. A fuse box 11 (second part) is supported on a bracket 9 arranged on the side of the battery 7.

The tray 5 has a top face formed in a substantially rectangular shape, and is provided at the front and rear ends of the outer edge in the vehicle transverse direction thereof with eye plates 15 extended outward in the vehicle transverse direction therefrom, and on the central part of the outer edge in the vehicle transverse direction with a tongue piece 17 extending upward therefrom. The eye plate 15 and the tongue piece 17 have a bolt insertion hole 13 and a lock hole thereon, respectively.

The battery 7 is mounted on to the tray 5 and tied thereto using the retainer member 19 and the bracket 9 surrounding the battery 7.

The retainer member 19 includes a vertically extending fixing rod 21 disposed on the outer side in the vehicle transverse direction of the battery 7, and a horizontally extending upper retainer member (pressing member) 23 provided on top of the battery 7. The fixing rod 21 has, at its lower end, a J-shaped hook 25 engaging with the lock hole of the tongue piece 17. The upper end of the fixing rod 21 is connected to the outer end in the vehicle transverse direction of the upper retainer member 23 with a nut 26. Also, the upper retainer member 23 is bent and formed in a Z-shape in side view, as shown in FIG. 2, to have a contact portion 29 which comes into contact with an upwardly facing upper face 7a of the battery 7 and presses it downward, a vertical wall 31 extending upward from the inner end in the vehicle transverse direction of the contact portion 29, and a flange 33 extending inward in the vehicle transverse direction from the upper end of the vertical wall 31 and connected to an upper-end flange 37 of the bracket 9.

The bracket 9 is extended vertically along an inner side face 7b in the vehicle transverse direction of the battery 7, and has the lower end thereof bent and extended outward in the vehicle transverse direction to be connected to the lower face of the tray 5 by welding. The upper end of the bracket 9 is bent to have the upper-end flange 37 extended inward in the vehicle transverse direction and fastened to the flange 33 of the upper retainer member 23 with the bolt 27. The bracket 9 is provided on upper part and lower part of the inner side in the vehicle transverse direction thereof with three stud bolts 39.

Moreover, the fuse box 11 is mounted on the inner side face in the vehicle transverse direction of the bracket 9. The fuse box 11 is provided with mounting flanges 41 on an upper end and a lower end thereof. Two bolt holes 43 are provided in the upper mounting flange 41, while a single bolt hole 43 in the lower mounting flange 41. These bolt holes 43 are located at positions corresponding to the respective stud bolts 39 of the bracket 9. The stud bolts 39 are inserted through the bolt holes 43 of the mounting flanges 41 and are tightened with nuts, whereby the fuse box 11 is mounted on the side of the battery 7.

The dimensional relations among the fixing rod 21 and the upper retainer member 23 of the retainer member 19, the bracket 9 and the battery 7 are set as shown in FIG. 2, in which the dimension H1 which is the height difference between the contact face of the contact portion 29 of the upper retainer member 23 to the lower face of the flange 33, is slightly larger than the dimension L1 which is the height difference between the top face of the flange 37 of the bracket 9 to the upper face 7a of the battery 7, before the bolt 27 is tightened. When tightening the bolt 27 to fasten the flange 33 of the upper retainer member 23 to the flange 37 of the bracket 9, each of the upper retainer member 23 and the bracket 9 elastically deforms, whereby the battery 7 is supported on the tray 5 with the upper face 7athereof pressed by the upper retainer member 23 downward, that is, in the state where the battery 7 is clamped between the upper retainer member 23 and the tray 5.

Figure 3:
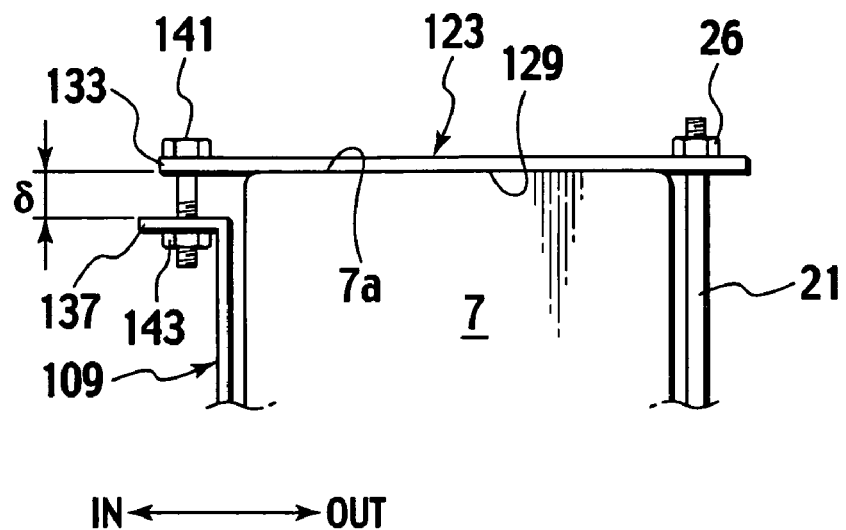
FIG. 3 is a front view showing a variation of an upper retainer member and a bracket.

FIG. 3 is a front view showing a variation of the upper retainer member and the bracket.

As shown in FIG. 3, an upper retainer member 123 is simply formed of a straight flat bar, which has a flange 133 at the inner end in the vehicle transverse direction thereof. A bracket 109 of this variation is formed shorter in vertical length than that of the bracket 9 in FIGS. 1 and 2, and a predetermined gap δ in the vertical direction is provided between a top face of an upper-end flange 137 of the bracket 109 and a lower face of the flange 133, as shown in FIG. 3. The flange 137 of the bracket 109 is fastened to the flange 133 of the upper retainer member 123, using a bolt 141 having a long unthreaded shank and a nut 143, FIG. 4 is a front view showing another variation of an upper retainer member and a bracket.

Figure 4:
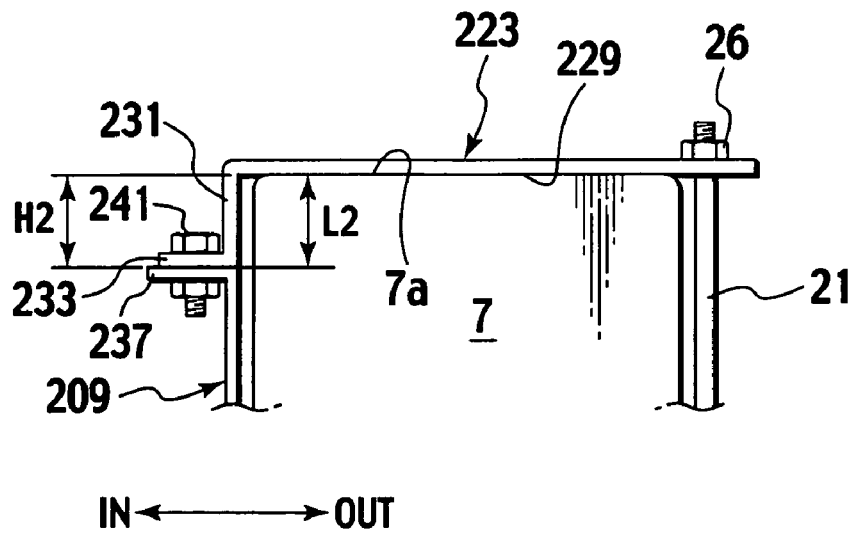
FIG. 4 is a front view showing another variation of an upper retainer member and a bracket.

As shown in FIG. 4, an upper retainer member 223 has a vertical wall 231 extending downward from the inner end in the vehicle transverse direction of the contact portion 229 and a flange 233 formed by bending the lower end of the vertical wall 231 and extended therefrom inward in the vehicle transverse direction. The upper retainer member 223 thus has a shape of an inversed upper retainer member 23 in FIGS. 1 and 2. The flange 233 of the upper retainer member 223 is fastened to an upper-end flange 237 of a bracket 209 by a bolt, in a similar way to that of the flanges 33 and 37 in FIGS. 1 and 2.

Similarly to the case of FIGS. 1 and 2, the contact portions 129 and 229 of the respective upper retainer members 123 and 223 in FIGS. 3 and 4 press the upper face 7a of the battery 7, when the upper-end flanges 137 and 237 of the brackets 109 and 209 are fastened to the flanges 133 and 233 of the upper retainer members 123 and 223, respectively.

In FIG. 3, the upper retainer member 123 and the bracket 109 elastically deform as the bolt 141 is tightened, with the distance δ between the flange 137 of the bracket 109 and the flange 133 of the upper retainer member 123 being gradually decreased. By adjusting the tightening torque of the bolt 141 as appropriate, the pressing force onto the battery 7 by the upper retainer member 123 can be adjusted.

Also, in the example shown in FIG. 4, the dimensional relations among the fixing rod 21 and the upper retainer member 223 of the retainer member 19, the bracket 209 and the battery 7 are set similarly to those in FIGS. 1 and 2, in which the dimension H1 which is the height difference between the contact face of the contact portion 229 of the upper retainer member 223 and the lower face of the flange 233 is slightly smaller than the dimension L2 which is the height difference between the top face of the flange 237 of the bracket 209 and the upper face 7a of the battery 7, before the bolt 241 is tightened. By tightening the bolt 241 to fasten the flange 237 of the bracket 209 to the flange 233 of the upper retainer member 223, the battery 7 can be supported on the tray 5 in the state where the upper retainer member 223 presses the upper face 7a of the battery 7 downward.

Below, the function and effect of the present invention according to the preferred embodiments will be explained.

As shown in FIGS. 1 and 2, the retainer member 19 includes the vertical fixing rod 21 extending from the tongue piece 17 provided on the outer edge in the vehicle transverse direction of the tray 5, and the upper retainer member 23 connected to the upper end of the fixing rod 21 for pressing the upper face 7a of the battery 7. Since the bracket 9 is connected at the upper end thereof to the upper retainer member 23 of the retainer 19, the supporting rigidity of the bracket 9 is improved and the mounting strength of the fuse box 11 mounted thereon is enhanced.

Further, since only the bracket 9 is disposed between the fuse box 11 and the battery 7, eliminating the need of a fixing rod, the space efficiency in the engine compartment can be improved.

Also, since the battery 7 is pressed against the tray 5 with the upper face 7a thereof being pressed downward by the upper retainer member 23, the battery 7 is secured and the supporting rigidity of the bracket 9 is improved. This also improves the mounting strength of the fuse box 11.

Moreover, since the bracket 9 and the upper retainer member 23 are formed so that the height difference between the top face of the flange 37 of the bracket 9 and the upper face 7a of the battery 7 is made smaller than the height difference between the lower face of the contact portion 29 of the upper retainer member 23 and the lower face of the flange 33, the upper face 7a of the battery 7 can be pressed downward securely by the upper retainer member 23 while the bracket 9 is supported on the flange 33 of the upper retainer member 23, and the mounting strength of the fuse box 11 is this improved.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2004-116638, filed on Apr. 12, 2004, the disclosure of which is expressly incorporated herein by reference in its entirety.

What is claimed is:

1. A support structure of parts for a vehicle comprising:
a tray adapted to be fixed to a structural member of a vehicle body for mounting a first part thereto;
a retainer member for retaining the first part on the tray; and
a vertically extending support bracket to support thereon a second part to be disposed beside the first part, wherein the support bracket is connected to the tray at a lower end thereof and to the retainer member at an upper end thereof, wherein
the upper end of the support bracket is bolt-fastened to the retainer member with a gap provided therebetween.

2. A support structure in claim 1, wherein
the retainer member comprises
a vertically extending first member connected to the tray at a lower end thereof; and
a horizontally extending second member for pressing an upper face of the first part, having one end connected to an upper end of the first member and the other end connected to the upper end of the support bracket.

3. A support structure in claim 2, wherein
the retainer member is configured to press the second member against the upper face of the first part.

4. A support structure in claim 3, wherein
the second member comprises a first portion to be brought into contact with the upper face of the first part and a second portion to be connected to the upper end of the support bracket, and wherein the second portion is configured to be applied with a force toward the support bracket while the first portion is set on the upper face of the first part.

5. A support structure in claim 4, wherein
the support bracket is provided at the upper end thereof with a horizontally extending first flange,
the second member is provided at the second portion thereof with a second flange which can be mated with the first flange, and
the second member is formed so that the gap is provided between the first flange and the second flange in the state where the first portion is in contact with the upper face of the first part.

6. A support structure in claim 1, wherein
the support bracket is detachable from the retainer member.

* * * * *